United States Patent
Shook et al.

(10) Patent No.: US 8,082,415 B2
(45) Date of Patent: Dec. 20, 2011

(54) ESTIMATING THE SIZE OF AN IN-MEMORY CACHE

(75) Inventors: Aaron Kyle Shook, Raleigh, NC (US); Andrew Ivory, Wake Forest, NC (US); Ching Chi Andrew Chow, Cary, NC (US); Erik John Burckart, Raleigh, NC (US); Rohit Dilip Kelapure, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 12/165,975

(22) Filed: Jul. 1, 2008

(65) Prior Publication Data

US 2010/0005266 A1    Jan. 7, 2010

(51) Int. Cl.
*G06F 12/00* (2006.01)
*G06F 13/00* (2006.01)
*G06F 13/28* (2006.01)

(52) U.S. Cl. ........ 711/172; 711/170; 711/173; 711/171; 711/118; 711/117

(58) Field of Classification Search .................. None
See application file for complete search history.

(56) References Cited

U.S. PATENT DOCUMENTS

| | | | |
|---|---|---|---|
| 5,561,786 A * | 10/1996 | Morse | 711/170 |
| 6,718,438 B2 * | 4/2004 | Lewis et al. | 711/129 |
| 7,725,771 B2 * | 5/2010 | Wintergerst et al. | 714/38 |
| 2009/0254706 A1 * | 10/2009 | Liu et al. | 711/118 |

* cited by examiner

*Primary Examiner* — Sanjiv Shah
*Assistant Examiner* — Marwan Ayash
(74) *Attorney, Agent, or Firm* — Cuenot, Forsythe & Kim, LLC

(57) ABSTRACT

This Sampling Object Cache System ("SOCS") estimates the size of an in-memory heap-based object cache without the need to serialize every object within the cache. SOCS samples objects at a user-determined rate and then computes a "sample size average" for each type of class—whether a top class, type of top class or non top class. Using these sample size averages, a statistically accurate measure of the overall size of the cache is calculated by adding together the total size of the objects in the cache for each class type.

6 Claims, 2 Drawing Sheets

ESTIMATING THE SIZE OF AN IN-MEMORY CACHE

FIELD OF THE INVENTION

The present invention relates generally to a method for estimating the size of the cache and specifically to a method for accurately estimating the size of an in-memory heap-based object cache.

BACKGROUND OF THE INVENTION

Currently, the method for determining the size of an in-memory heap-based (area of memory reserved for data created at runtime) object cache (high-speed storage mechanism) is a difficult and expensive processes. The primary method for this process is known in the art as "serialization." Serialization is a process that saves an object onto a storage medium (such as a file or memory buffer) or transmits the object across a network connection link in binary form. To serialize a cache, one must serialize all the objects in a cache. This is an expensive, extensive, and processor intensive practice. Thus, a need exists for an accurate method to estimate the size of a cache that does not require serialization of every object within the cache.

SUMMARY OF THE INVENTION

A computer implemented process for determining the total size of an in-memory heap-based object cache that does not require serialization of every object within the cache is disclosed. A plurality of top class types are defined. Each class type represents a total number of instances of a class, and a class is designated a top class if a class number exceeds a user defined threshold. The class number is calculated by dividing the number of instances of the class by the total number of instances of all classes, and the user defined threshold is selected to identify a class having a class number that exceeds the user defined threshold of a top class. A plurality of non top classes are defined. Each non top class is excluded from the plurality of top class types. A plurality of objects are loaded into the in-memory heap-based object cache. A portion of the plurality of objects is sampled in accordance with a user-defined criteria. A sample size average is determined for objects in each type of top class and each non top class, whether each of the plurality of objects are to be sampled. A size of each type of top class is calculated by multiplying a number of objects within the particular type of top class by the sample size average for that particular type of top class. A top class total size is calculated by adding together the size of each type of top class. A non top class total size is calculated by multiplying a number of objects within the non top classes by the sample size average for non top classes. The total size of the in-memory heap-based object cache is calculated by adding the top class total size and non top class total size. The total size of the cache includes both the sampled and un-sampled objects within the cache.

BRIEF DESCRIPTION OF DRAWINGS

The novel features believed characteristic of the invention are set forth in the appended claims. The invention itself, as well as a preferred mode of use, further objectives, and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the SOCS are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as "SOCS."

Figure 1:
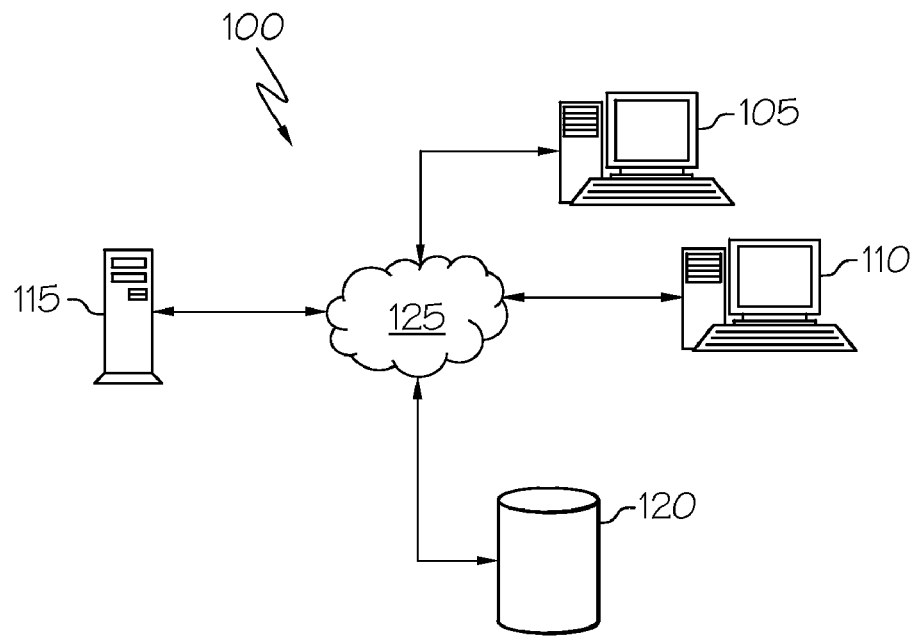
FIG. 1 depicts an exemplary network in which the SOCS may be employed.

Additionally, SOCS is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
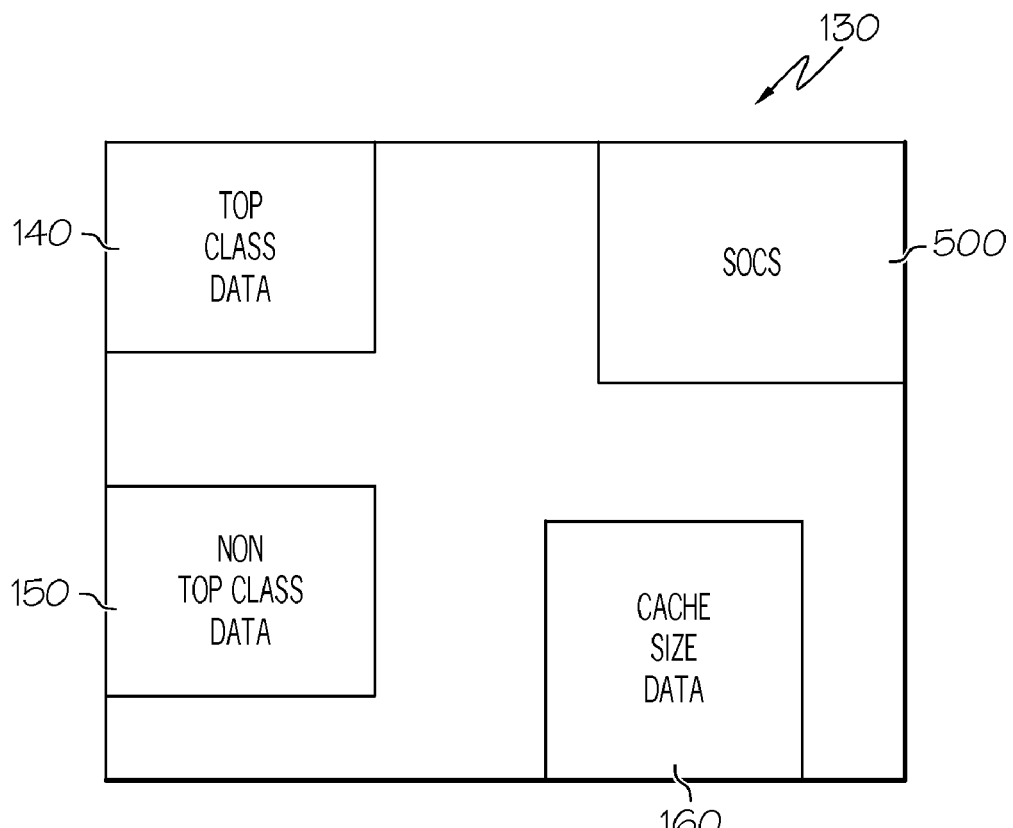
FIG. 2 depicts an exemplary memory in which the SOCS is encoded.

SOCS is typically stored in a memory such as memory 130 of FIG. 2, is represented schematically as SOCS 500. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, SOCS 500 may reside in more than one memory distributed across different computers, servers, logical partitions, or other hardware devices. The elements depicted in memory 130 may be located in or distributed across separate memories in any combination, and SOCS 500 may be adapted to identify, locate, and access any of the elements and coordinate actions, if any, by the distributed elements. Thus, FIG. 2 is included merely as a descriptive expedient and does not necessarily reflect any particular physical embodiment of memory 130. As depicted in FIG. 2, though, memory 130 may include additional data and programs with which SOCS 500 interacts with, such as top class data file 140, non top class data file 150, and cache size data file 160.

As used herein, "top classes" means the user defined class types that have the most entries within the cache and which are the most common class types. There may be several "types" of top classes. Each class type represents a total number of instances of a class. A class is designated a top class if a class number exceeds a user defined threshold, the class number being calculated by dividing the number of instances of the class by the total number of instances of all classes. The user defined threshold is selected to identify a class having a class number that exceeds the user defined threshold of a top class. Other methods of determining top classes may be used. As used herein, "non top classes" means all other class types that do not fall within the user defined top classes. As used herein, "sample size average" means the average sampled size of objects in a particular class type.

Figure 3:
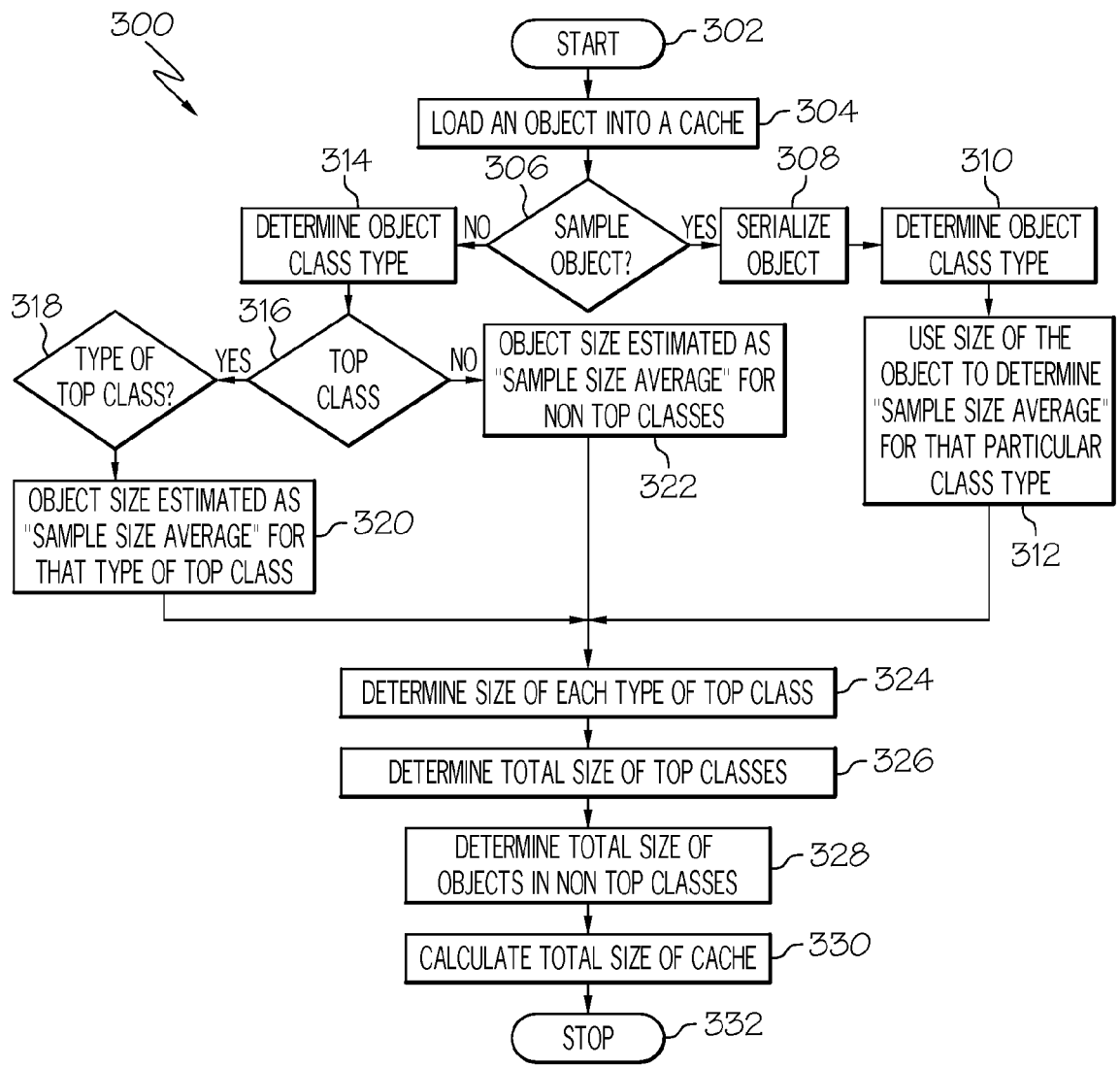
FIG. 3 depicts a flow chart of the program of SOCS.

FIG. 3 illustrates the operation of SOCS 500. SOCS starts (302) and loads an object into the cache (304). A determination is made whether the object is to be sampled (306). If the object is to be sampled, the object is serialized (308). Once the object is serialized, and the size of the object is determined, a determination is made as to the class type of the object—i.e., whether top class or non top class and if top class, what top class type (310) The size of the object is then factored into the "sample size average" for that particular class type (312). The sample size average for a particular class type is calculated by adding the sizes of the objects sampled and serialized for that particular class type and then dividing that number by the number of objects serialized in that particular class type (312).

If the object is not to be sampled, then the object class type is determined (314). If the object is classified as a top class (316), then the type of top class is determined (318). The size of the object is then estimated as the sample size average of an object for that particular type of top class (320). If the non-sampled object is not an object in one of the top classes, and instead is a non top class object, then the size of the object is estimated as the sample size average for a non top class object or for an object not a part of the top classes (322).

The SOCS then begins to calculate the total size of the cache (320) based on the sample size averages and number of objects in the cache. The total size of the cache (330) is determined by adding the total size of objects in the top classes (326), plus the total size of the objects in the non top classes (328). The total size of the objects in the top classes (326) is determined by first calculating the size of each type of top class (324). To determine the size of each type of top class (324), SOCS multiplies the number of objects within that particular type of top class by the sample size average for that particular type of top class. The total sizes for each type of top class are then added together to determine a total size of all of the objects in the top classes (326). Similarly, the total size of the objects in the non top classes (328) is determined by multiplying the sample size average for each of the non top classes by the number of objects within the cache not included in the top classes. Once the total size of the objects in the non top classes is determined (328), this number is added to the total size of the top classes to determine the total size of the objects in the cache (330). Once the total size of the objects in the cache is calculated, the SOCS stops (332). Thus, the calculation of the total size of the cache (330) is determined as follows: Total Size of Cache=((Number of Objects in Top Class Type 1*Sample Size Average for Top Class Type 1)+ (Number of Objects in Top Class Type 2*Sample Size Average for Top Class Type 2)+etc.)+(Sample Size Average of Non top Classes*Number of Objects Not Included in the Top Classes). In another example, the total size of the cache is determined by:

Result=0;
For each Class Type in the Top Classes: {Result=Result=Sample Size Average of Class Type Number of Objects in the Top Class Type}
Result=Result+Sample Size Average of Non top Classes*Number of Objects in the Non top Class In an alternative embodiment, not shown, the user's cache is a mixed memory/disk cache. Where the user's cache is a mixed memory/disk cache, the process of sampling becomes unnecessary. Objects on disk have already been serialized in mixed memory/disk cache, such that the user may simply determine the object class and type, if applicable, (310) and then use the size of the object to determine the "sample size average" for that particular class type (312), thus eliminating the need for sampling.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way expect by proper construction of the following claims.

What is claimed:

1. A computer implemented process for determining the total size of an in-memory heap-based object cache, that does not require serialization of every object within the cache, the computer implemented process comprising:

defining a plurality of top class types, wherein each class type represents a total number of instances of a class and wherein a class is designated a top class if a class number exceeds a user defined threshold, the class number being calculated by dividing the number of instances of the class by the total number of instances of all classes, and the user defined threshold being selected to identify a class having a class number that exceeds the user defined threshold of a top class;

defining a plurality of non top classes, each non top class being excluded from the plurality of top class types;

loading a plurality of objects into the in-memory heap-based object cache;

sampling a portion of the plurality of objects in accordance with a user-defined criteria;

determining a sample size average for objects in each type of top class and each non top class, whether each of the plurality of objects are to be sampled;

calculating a size of each type of top class by multiplying a number of objects within the particular type of top class by the sample size average for that particular type of top class;

calculating a top class total size by adding together the size of each type of top class;

calculating a non top class total size by multiplying a number of objects within the non top classes by the sample size average for non top classes; and calculating the total size of the in-memory heap-based object cache, by adding the top class total size and non top class total size, wherein the total size of the cache comprises both the sampled and un-sampled objects within the cache.

2. The computer implemented process of claim 1 wherein the in-memory heap-based object cache is a mixed memory/disk cache.

3. An apparatus for determining the total size of an in-memory heap-based object cache, that does not require serialization of every object within the cache, the apparatus comprising:
- a processor;
- a memory connected to the processor;
- a top class data and non top class data and a cache size data in the computer memory; and
- a Sampling Object Cache System in the memory operable to:
  - define a plurality of top class types, define a plurality of non top classes, load a plurality of objects into the in-memory heap-based object cache;
  - sample a portion of the plurality of objects in accordance with a user-defined criteria;
  - determine sample size average for objects in each type of top class and in each non top class whether each of the plurality of objects are to be sampled;
  - calculate a size of each type of top class by multiplying a number of objects within the particular type of top class by the sample size average for that particular type of top class;
  - calculate a top class total size by adding together the size of each type of top class;
  - calculate a non top class total size by multiplying a number of objects within the non top classes by the sample size average for non top classes; and
  - calculate the total size of the in-memory heap-based object cache, by adding the top class total size and non top class total size, wherein
the total size of the cache comprises both the sampled and un-sampled objects within the cache; wherein
each class type represents a total number of instances of a class and wherein a class is designated a top class if a class number exceeds a user defined threshold, the class number being calculated by dividing the number of instances of the class by the total number of instances of all classes, and the user defined threshold being selected to identify a class having a class number that exceeds the user defined threshold of a top class.

4. The apparatus of claim 3 wherein
the in-memory heap-based object cache is a mixed memory/disk cache.

5. A computer readable memory containing a plurality of instructions, which upon being executed by a computer hardware system, cause the computer hardware system to determine the total size of an in-memory heap-based object cache, that does not require serialization of every object within the cache, the plurality of instructions comprising:
- a first instruction to define a plurality of top class types;
- a second instruction to define a plurality of non top classes;
- an eighth instruction to load a plurality of objects into the in-memory heap-based object cache;
- a ninth instruction to sample a portion of the plurality of objects in accordance with a user-defined criteria;
- a third instruction to determine sample size average for objects in each type of top class and in each non top class whether each of the plurality of objects are to be sampled;
- a fourth instruction to calculate a size of each type of top class by multiplying a number of objects within the particular type of top class by the sample size average for that particular type of top class;
- a fifth instruction to calculate a top class total size by adding together the size of each type of top class;
- a sixth instruction to calculate a non top class total size by multiplying a number of objects within the non top classes by the sample size average for non top classes; and
- a seventh instruction to calculate the total size of the in-memory heap-based object cache, by adding the top class total size and non top class total size, wherein the total size of the cache comprises both the sampled and un-sampled objects within the cache;
wherein each class type represents a total number of instances of a class and wherein a class is designated a top class if a class number exceeds a user defined threshold, the class number being calculated by dividing the number of instances of the class by the total number of instances of all classes, and the user defined threshold being selected to identify a class having a class number that exceeds the user defined threshold of a top class.

6. The computer readable memory of claim 5 wherein
the in-memory heap-based object cache is a mixed memory/disk cache.

* * * * *